(12) United States Patent
Tsao

(10) Patent No.: US 9,307,055 B1
(45) Date of Patent: *Apr. 5, 2016

(54) METHOD AND SYSTEM FOR CONCURRENT WEB BASED MULTITASKING SUPPORT

(71) Applicant: Sheng Tai (Ted) Tsao, Fremont, CA (US)

(72) Inventor: Sheng Tai Tsao, Fremont, CA (US)

(73) Assignee: Sheng Tai (Ted) Tsao, Fremont, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/513,695

(22) Filed: Oct. 14, 2014

Related U.S. Application Data

(63) Continuation of application No. 13/448,807, filed on Apr. 17, 2012, now Pat. No. 8,892,742, which is a continuation of application No. 12/075,314, filed on Mar. 4, 2008, now Pat. No. 8,799,473, which is a continuation of application No. 10/713,904, filed on Aug. 6, 2002, now Pat. No. 7,418,702.

(51) Int. Cl.
*G06F 15/173* (2006.01)
*H04L 29/06* (2006.01)
*H04L 29/08* (2006.01)

(52) U.S. Cl.
CPC .............. *H04L 69/18* (2013.01); *H04L 67/10* (2013.01)

(58) Field of Classification Search
None
See application file for complete search history.

(56) References Cited

U.S. PATENT DOCUMENTS

| 6,769,019 | B2 * | 7/2004 | Ferguson | ........... G06Q 30/0251 705/14.49 |
| 2004/0030643 | A1 * | 2/2004 | Madison | ............. G06F 11/0709 705/39 |

* cited by examiner

*Primary Examiner* — Mohamed Ibrahim

(57) ABSTRACT

The traditional web based computing system did no support user space multitasking. Therefore, if a task is submitted by a user from a web browser window, the user has to wait the task to be completed before the user can submit another task. Thus a problem associated with the issue of lack of web based user space multitasking will be escalated and become apparent to the user in many instances. For example the web browser window will experience being blocked or hanged and the user can not do anything but wait. A method is disclosed herein for controlling each user initiated task to be run in background of the web based computing system and causing display of the UI again for the user to not wait the completion of said task.

20 Claims, 7 Drawing Sheets

Console support in a Simple Computing Environment

Data traveling between web-console and console supporting software a) Data Path 1:
Referred as sending data from web-console 9 to console support software 6 or referred as console supporting software 6 receiving data from web-console 9.

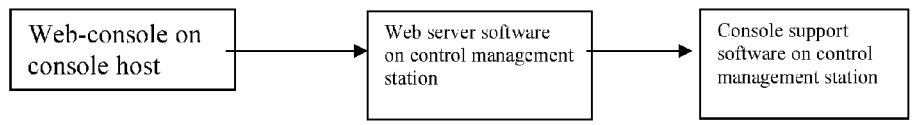

b) Data Path 2: (reverse path)
Referred as sending data from console supporting software 6 to web-console 9 or referred as web-console 9 receiving data from console supporting software 6.

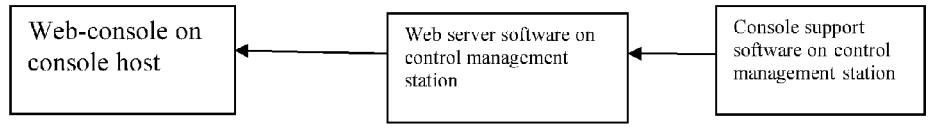

Fig. 3

Basic Task & Operation Processing Flow Chart in a CCDSVM environment

The abstract data structure for supporting multiple simultaneous concurrent tasks and operations in a CCDSVM environment The typical hardware components of a computer system such as for control management station, system units, and console host:

METHOD AND SYSTEM FOR CONCURRENT WEB BASED MULTITASKING SUPPORT

CROSS-REFERENCES TO RELATED APPLICATION(S)

This application is a continuation application of (a) U.S. patent application Ser. No. 13/448,807 filed on Apr. 17, 2012, now a U.S. Pat. No. 8,892,742 which in turn is a continuation application of the U.S. patent application Ser. No. 12/075,314 filed on Mar. 4, 2008 and now a U.S. Pat. No. 8,799,473, which itself in turn is a continuation application of U.S. patent application Ser. No. 10/713,904 filed on Aug. 6, 2002 and converted from provisional application 60/401,238, and now is a U.S. Pat. No. 7,418,702. All above applications are herein incorporated by reference in their entireties for all purpose.

FIELD OF THE INVENTION

The present invention generally relates to support web based multitasking for a single computing device or for a central controlled distributed scalable virtual machine system ("CCDSVM") with respect to a web based computer user work environment.

BACKGROUND OF THE INVENTION

A typical computer system provides a computer user work environment to end users, wherein the computer user work environment runs on top of a generic computer operating system. With this work environment, an end user can login to the computer system and access to various computer resources based on his or her permitted role. Therefore, the end user, for example, can perform tasks such as configure computer resources of disk drives, networks, files, folders, and directories on the computer system, and access to various computer applications, and the computer operating system of the computer system provides the results of the tasks to the end user. Specially, with a generic computer operating system, this computer user work environment allows multiple concurrent users to perform multiple concurrent tasks or operations.

The computer user work environment has evolved from paper tape & punch card environment, to command line environment, and further to window environment for a local computer system in the past. This invention provides users a web-based computer user work (operating) environment on top of generic operating system for a single or multiple computers, and allows each of the users access to one or multiple computing systems through a conventional web-browser.

BRIEF DESCRIPTION OF THE DRAWINGS

The accompanying drawings, which are incorporated into and constitute a part of this specification, illustrate one or more examples of embodiments and, together with the description of example embodiments, serve to explain the principles and implementations of the embodiments.

In the drawings:

FIG. 3 illustrates an example of basic data flow between a web-console on a console host and the console supporting software in a control management environment.

BRIEF DESCRIPTION OF THIS INVENTION

The traditional web server or other server may support a user from a web browser displayed on a computing device somewhere on the network to perform tasks of access to the server, where the tasks could get quick response and could be finished in a short period of time, for example, checking a web server's status or getting the server's other information, etcetera. However, the traditional server or web server does not support for multiple concurrent tasks or operations submitted from the same web-browser, and this problem will be escalated and manifested to people, especially when these tasks are time consuming to be finished.

For example, creating a 60 GB file system on the server, or transferring a 5 GB of file, or configuring a raid controller on that server is such a time consuming task. Because these tasks often take a large amount of time to be finished, and thus the user will experience the task being hang and blocking in the web-console window on a console host 1 illustrated in FIG. 1. As a result, no other tasks could be performed in parallel from the same web-console at the same time. In addition, traditional console supporting software does not work for a more complicated environment such as the CCDSVM environment illustrated in FIG. 2.

Figure 1:
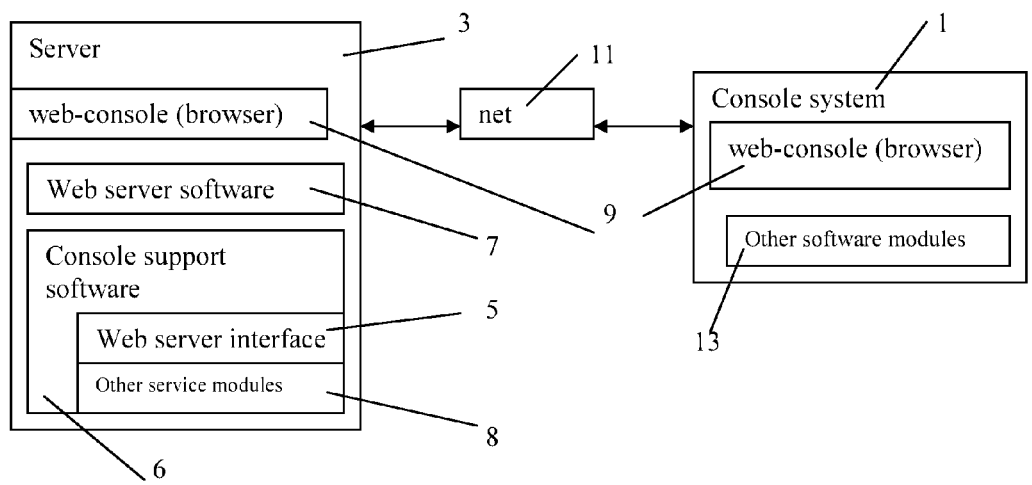
FIG. 1 illustrates an example of a simplified web based multi-tasks support in a simple environment.
Figure 2:
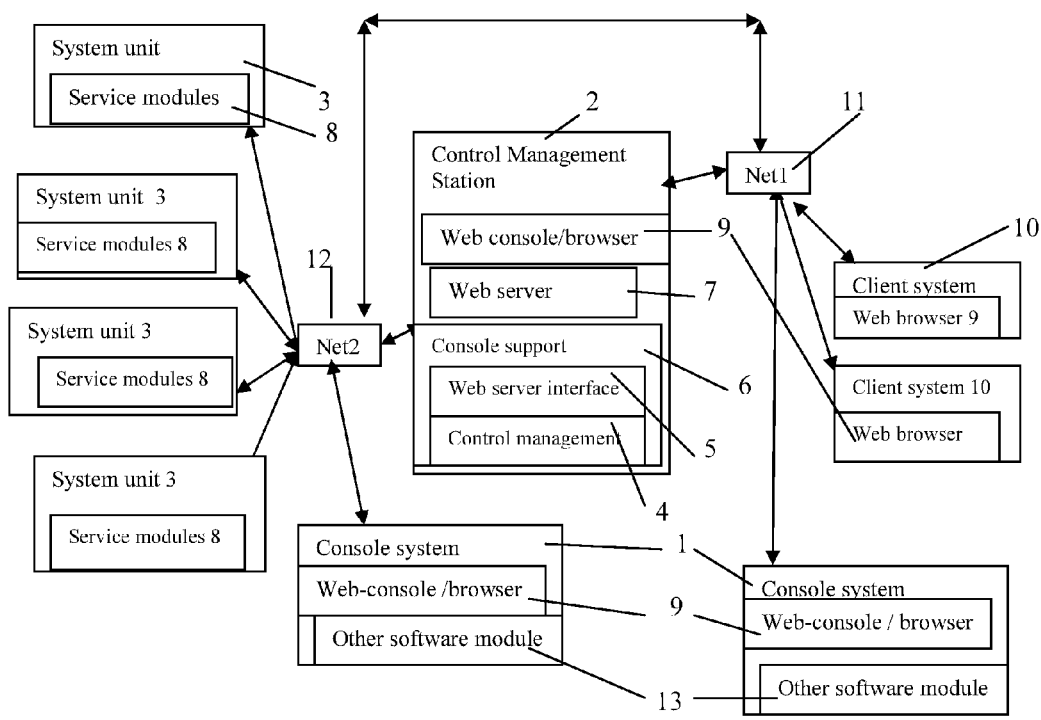
FIG. 2 illustrates an example of a simplified web based multi-tasks support in a CCSVM environment.

To solve these problems and effectively to support multiple concurrent tasks in a web-console for both the simple computing environment illustrated in FIG. 1 and the CCDSVM environment, the console supporting software 6 in FIG. 1 needs to include additional control management software modules 5 illustrated in FIG. 2 and others. As illustrated in FIG. 2, the control management software module 4 shall communicate with and control all system units 3 and each of the system units 3 needs service software modules 8 to communicate with the control management software 4 of the console support software 6.

Figure 5:
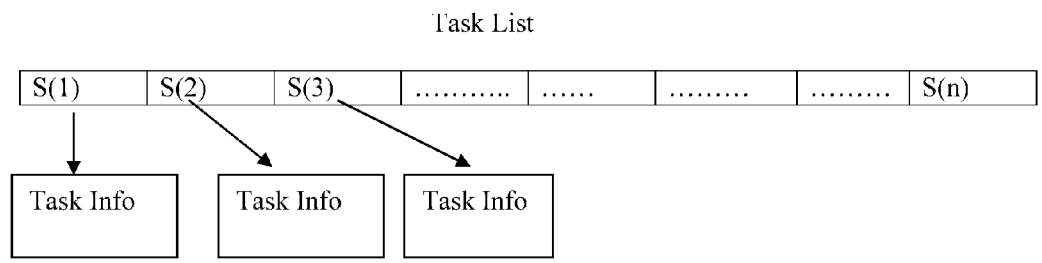
FIG. 5 illustrates an example of a user space task list, which represents an abstraction of data structure, for controlling multiple concurrent tasks and operations in the CCDSVM environment.

In addition, a user space task list illustrated in FIG. 5 could be used together with conventional or non-conventional locks to support all multiple concurrent tasks and operations. With this invention, the multi-tasks support for the web-console in a simple computing environment shown in FIG. 1 has been viewed as a special case of such support in a CCDSVM environment shown in FIG. 2. The CCDSVM will be degenerated into a simple server as illustrated in FIG. 1 if there is no multiple system units 3 that are illustrated in FIG. 2.

These and other features, aspects and advantages of the present invention will become understood with reference to the following description, appended claims and accompanying figures set forth below.

DETAILED DESCRIPTION OF THE INVENTION

The CCDSVM in a embodiment is configured to provide a control management station ("control system") to control a group of computing systems and provide distributed services to at least one client system across Intranet, the Internet as well as a LAN environment. The software components of the CCDSVM form a virtual operating environment.

When a server provides software support to allow a user, via a web-browser on a computing system such as a desktop, laptop, server, PDA, or cell phone, access to and manage the server, this web-browser is often referred as a web-console. With the CCDSVM, a permitted user from the web-console should be able to access and operate the entire CCDSVM.

To simplify the discussion, the term of thread and process are roughly used without differentiation between them in this invention regardless of the very restricted definition of the thread and process in the field of computer science. Here both thread and process are basically referred as a sequence of instructions based on a piece of program code that starts to be executed by a computer system step by step to carry out a computer task.

Lock is a mechanism that allows a thread to look a computer resource for its own use and prevents other threads from access to the same computer resource at the same time. There is conventional lock which can be acquired and released by the same thread. The conventional lock mechanisms have used by most software developer crossing the software industry. The lock described in this invention may or may not be a conventional one. The non-conventional lock mechanisms created in this invention can be acquired by one thread and may be released by same thread or by another thread. Therefore, it is non-conventional lock serving threads on the computing system.

FIG. 1 illustrates an example of a web-console scheme in a simple computing environment that includes a console host 1, a server 3, and a communication network 12. The console host 1 further includes a web-console 9 (a browser). The server 3 includes a native web-console 9, a web server software 7, and a console support software 6, where the console support software 6 further includes web server interface 5 and other service modules 8. It should be noted that the same reference indicators will be used throughout the drawings and the following description to refer to the same or like items.

The console host 1, from which a user is able to perform system tasks or operations for the server 3 through the web-console (browser) 9 in addition to, otherwise, regular access. The console host 1 can be any computing system on the network 12 such as a server, a desktop PC, a laptop PC, a hand held PDA, or a cell phone. The web browser 9 may be commercially available software from any vendor or proprietary software. The web browser 9 is able to handle web protocol such as HTTP. The console host 1 may also include other software modules 13 that may be implemented with any suitable programming languages such as C, C++, Java, XML, et cetera. The other software modules 13 are used to communicate between the server 3 and the console host 1 using IP, non-IP or any suitable protocols for receiving and/or sending data between the console host 1 and the server 3.

The server 3 could be a web server or any kind of computing system with web server software that includes web server software 7 and console supporting software 6. The console supporting software 6 includes web server interface 5 and other services software modules 8, where the other services software 8 is operated natively on the server 3 in response to service request. The web server software 7 may be a commercially available software or proprietary software, which is able to accept and handle the web protocol such as HTTP. A native web-console (browser) 9 enables a user to access and operate the server computer 3 locally or the Internet.

Net 12 represents a network infrastructure such as Internet, intranet, and (LAN) or WAN. The net 12 includes all kind of related network equipment and media such as switches/routers, and different kind of connecting media, cables and wireless communication media.

FIG. 2 shows an example of a simplified block diagram for an embodiment of the CCDSVM. The CCDSVM system includes console hosts 1, a control management station 2, system units 3, networks of net1 11 and a net2 12, and client systems 10. The console hosts 1 could be any computing system on the network such as a server, a desktop PC, a laptop PC, a hand held PDA, or a cell phone. A web browser 9 of the console host 1 can be used access to and operate the entire CCDSVM. The web browser 9 may be commercially available software from any vendor or proprietary software company. The web browser 9 is able to handle web protocol such as HTTP. A difference between a web-console 9 and a web browser is that the web-console 9 allows a user access to system information and performing system operation over computing systems such as in the CCDSVM environment.

The console host 1 may also include other software modules 13, which may be implemented with any suitable programming languages such as C, C++, Java, XML etc. These software modules 13 may be used to facilitate communications between the control management station 2 and the console hosts 1 using IP, non-IP or any suitable protocols for receiving or sending data between the console host 1 and the control management station 2. To support a non-web-based networked console, the software configured for the console 9 must be configured to handle protocols other than web protocols of HTTP and must communicate with the console supporting software 6 on the control management station 2.

The control management station 2 could be any computing system on the network such as a server, a desktop PC, a laptop PC, or others communication device for controlling and managing multiple system units 3 for delivering of distributed services or contents. In addition to run with operating system such as Linux, Unix, or Windows or other OS, the control management station 2 also includes web server software 7 and console supporting software 6. The console supporting software 6 includes web server interface software modules 5 and control management software modules 4. It should be noted that the console supporting software 6 may includes others service software modules 8 for providing service. It may also have a native web browser used as a native web-console 9. The web server software 7 discussed earlier could be commercially available software from a major vendor or other proprietary software that is able to accept and handle the web protocol such as HTTP. The web server software 7 sends data to and receives data from the web-console 9 of the console hosts 1.

The console supporting software 6 can be implemented with any suitable languages such as C, C++, Java, XML, etc. or even implemented by using a combination of different languages as long as it provides the features and functionality described in this invention. That means it is language independent. In addition, the communication protocol used between the console support software 6 and the service software modules 8 of the system units 3 could be any suitable protocol such IP based, or non-IP based or other protocols.

There may be several fixed threads being created based on the control management software modules 4. There are may be various number of threads that are created based on the web server interface software modules 5 for supporting each of tasks initiated by a user through the web-console 9. All of these threads may be communicated with each other through inter-process communication and are simply referred as the thread of the console supporting software 6. However, to simplify the discussion, they may be just referred as the console supporting software 6 without mentioning the thread at all.

If there is a need to support a non-web-based networked console, there is no need for the web server software 7 and web server interfacing software module 5 to be employed. Instead, an additional network software module is required that could be implemented with any suitable programming language and using any suitable communication protocol other than web protocol (HTTP). This network software module can communicate with networked console software 9 on the console host 1 across a communication network and can communicate with the rest of the console supporting software 6 via inter-process communication mechanism. In addition, all methods and principles of supporting web based multi-tasking described in this invention are also applicable to support the non-web based networked console.

The system unit 3 could be any computing system on the network such as a server, a desktop PC, a laptop PC, a communication device such as a hand held PDA or a cell phone, and any operational computing system. The server could be, but not limited to, a video server, a web server, a storage block data server (SAN unit) or network attached storage (NAS), a video monitoring device. The system unit 3 contains service software modules 8 which are capable of communicating with the outside world. For example, the service modules 8 is used to communicate with the control management software 4 of the control management station 2 for carrying out the tasks distributed from the control management station 2, or to communicate with the clients 10 of the CCDSVM for delivering services to them, or to communicate with another system unit 3 for transferring the data. The service software modules 8 could be implemented with any suitable programming languages such as C, C++, Java, or others. It should be noted that the communication protocol could be any suitable protocol such as IP (Internet Protocol) base or other non-IP based protocol.

The net1 11 represents any kind of communication links between the control management station 2 and the web-console 9 or the client hosts 10. The net1 11 could be an infrastructure of internet, intranet, LAN WAN or others that comprises connection media such as, but not limited to, Ethernet or optical Fiber communication media and cables, and/or other such as wireless media, bus, and also includes communication equipment such as switches, routers, and/or adapters.

The net2 12 also represents a communication infrastructure comprising communication media and equipment that are similar to the net1 11 has, except for providing communication between the control management station 2 and the system units 3 or the web-consoles 9 across the infrastructure of internet, intranet, LAN, WAN, or other.

The client systems 10 may not be part of the CCDSVM in one embodiment, but they may requests services from the CCDSVM as shown in FIG. 2. The role of the client systems and the connections between the client system 10 and system unit 3 will not be described in details in this invention.

FIG. 3 illustrates a simplified data flow between the web-console 9 on the console host 1 of FIG. 2 and the console supporting software 6 on the control management station 2 of FIG. 2. Data travel from the web-console 9 to the console supporting software 6 includes two steps. First, the data goes from the web-console 9 to the web server software 7 of FIG. 2 via the net 11 or 12 of FIG. 2. Second, the console supporting software 6 obtains the data from the web server software 7 of FIG. 2 via inter-process communication. To simplify the discussion of this invention, this data traveling path will simply refer to as the console supporting software 6 obtains the data from the web-console 9 or refer to as the data being sent from the web-console 9 to the console supporting software 6.

Data traveling from the console supporting software 6 to the web-console 9 includes two reverse steps. First, the web server software 7 gets the data from the console supporting software 6 via inter-process communication. Second, the web server software 7 sends data to the web-console 9 via the net 11 or 12. To simplify the rest of discussion, this reverse data traveling will refer to as data being sent from the console supporting software 6 to the web-console 9 or refer to as the web-console 9 gets data from the console supporting software 6. In addition, the terms of data may also be referred as information, or information on a web page and they will be used interchangeably herein.

Figure 4:
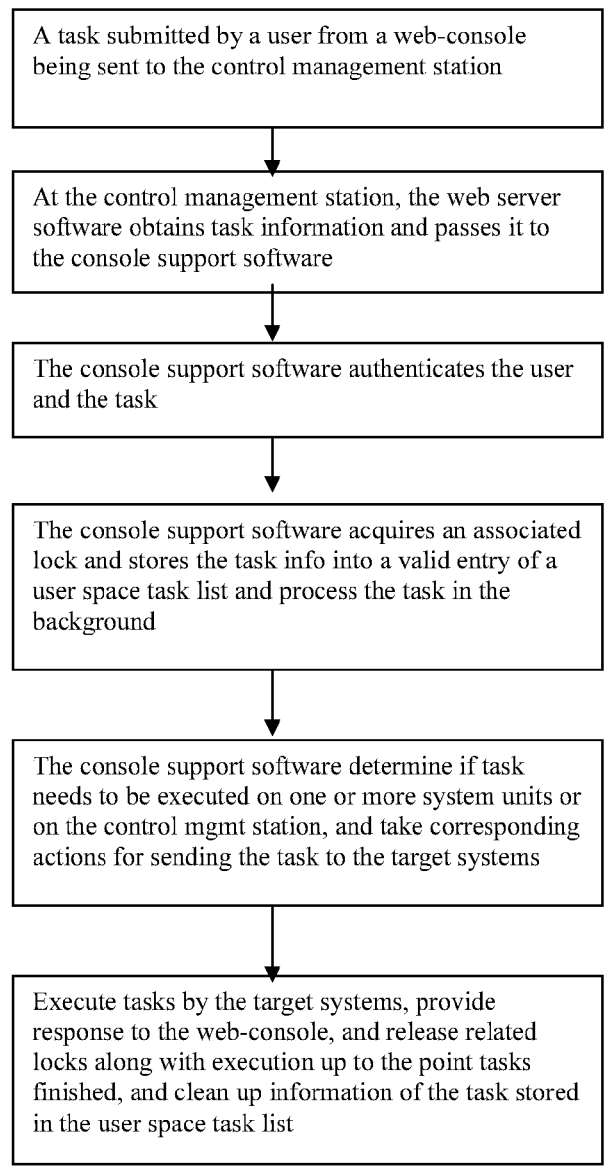
FIG. 4 illustrates an example of operation flow for processing a user submitted task in the CCDSVM environment.

FIG. 4 shows the basic tasks and operation processing flow chart, which initiated from the web-console 9.

FIG. 5 shows one embodiment of a user space task list. Each entry on the user space task list can be used to store information of a task issued from a web-console 9 and the status of the entry is marked as used. The stored information of the task in the entry on the user space task list will be removed after the task execution is completed and the entry status will be marked as not used.

Figure 6:
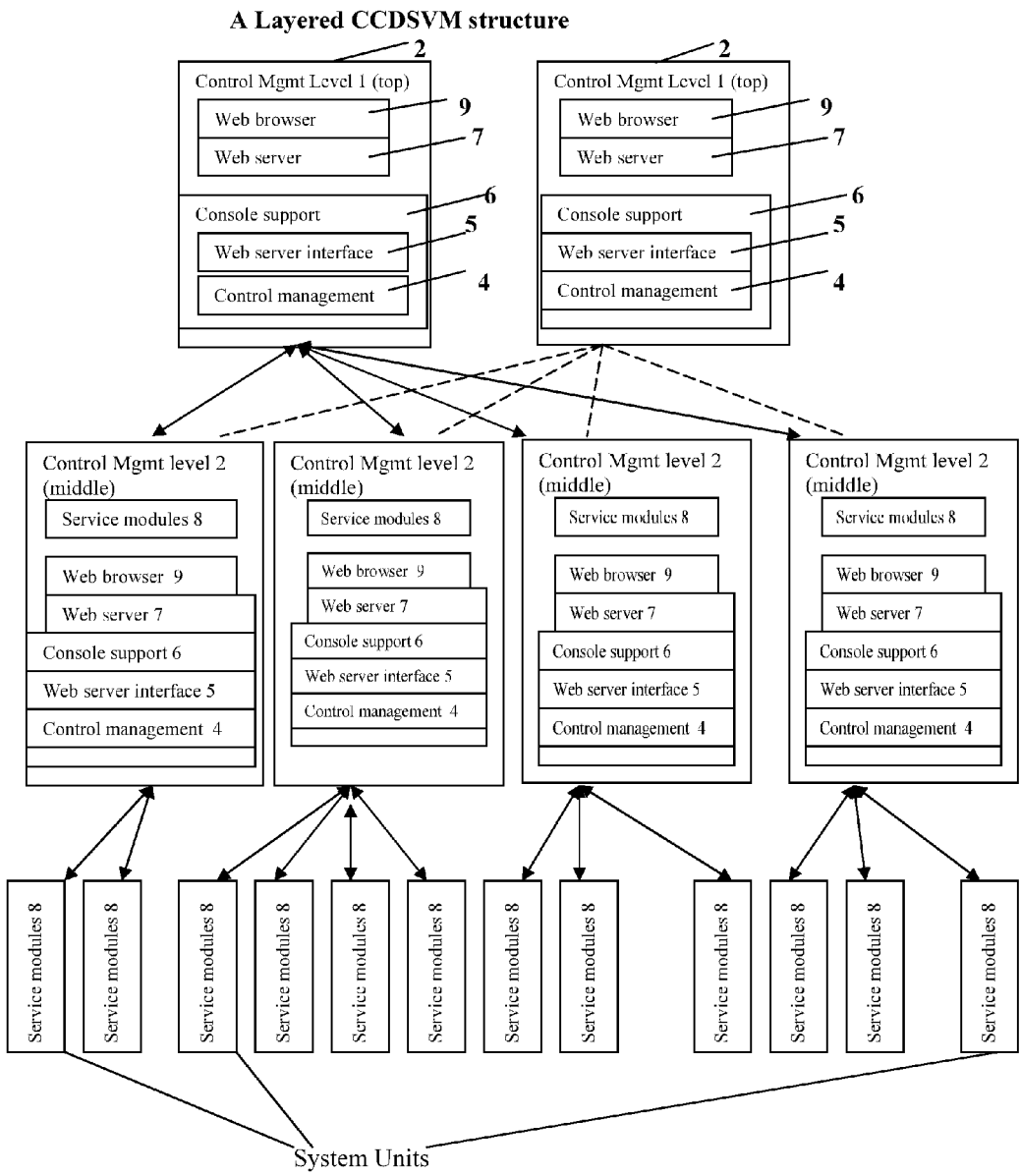
FIG. 6 illustrates one embodiment of a multi-layered CCDSVM structure.

FIG. 6 illustrates another embodiment of a layered CCDSVM environment, which provides a flexible scalability mechanism to efficiently support thousands of heterogeneous system units 3. With this structure, a control management station 2 at middle layer 2 becomes a system unit 3 and is controlled by a control management station 2 at up layer 1.

Figure 7:
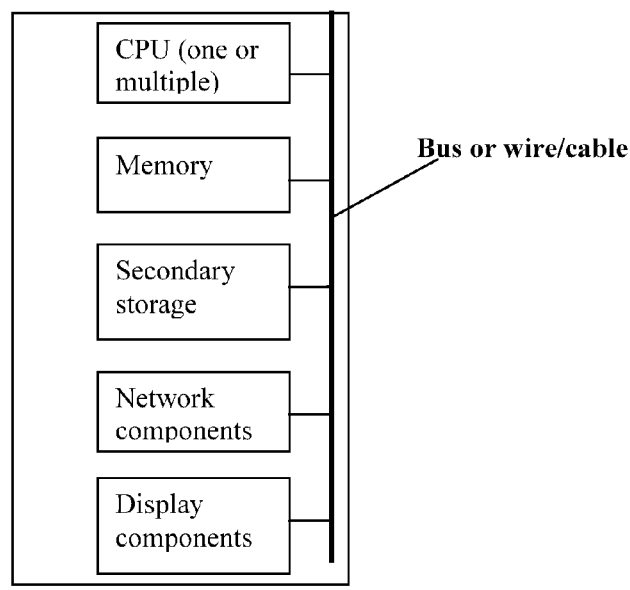
FIG. 7 illustrates an embodiment of typical hardware components for a computing device.

FIG. 7 illustrates a embodiment of typical hardware components for a computing device such as for the control management system 2, system units 3, and console hosts 1. The typical hardware components comprises of one or more CPU, memory, secondary storage such as disk drives and/or memory sticks, the network interface cards, and display components such as monitor or others. These components are connected internally through buses.

The detailed explanation of FIG. 2 will demonstrate how multiple concurrent tasks can be initiated from a web-console 9 and can be executed either on any one of the system units 3 or on the control management station 2 according to this invention.

In one example, a user A at a web-console 9 receives an authentication from the console supporting software 6. In one embodiment, a successfully login on the control management station 2 is considered an authentication because it authorizes the user named "A" access to the CCDSVM. Thereafter, the user "A" can obtain all necessary information about the system units 3 and the control management station 2 from the console supporting software 6. The information obtained could be, but not limited to, the IP address of each system units, information of devices such as disk drives or network cards, information of a file configured on a system in the CCDSVM that could be selected by a user for performing tasks. When the user A initiates a task for a selected target computing system, which is either a system unit 3 or the control management station 2, the task information is transmitted via the net 11 or 12 from the web-console 9 to the console support software 6 on the control management station 2.

One or more threads will be created based on the console support software 6 for serving and carrying out this task. The one of the one or more created threads acquires a lock and stores the task information into a not used (valid) entry on a user level task list shown in FIG. 5. In one embodiment, after storing the task information, another one of the one or more threads will release the lock and run the task in the background. Meanwhile, another thread, waiting for the lock for handling and responding to a second task submitted by the same user, now can obtain the lock for storing the second task's information in a second not used entry on the user space task list, so that the second task is timely responded for further processing and can run parallel with the previous task. This ensures that each of the multiple tasks can be initiated and concurrently run within the same web-console 9 of FIG. 2 without delaying, effecting or blocking in the web-console 9 window and free from racing each other.

In addition, multiple web-consoles 9 for multiple concurrent users anywhere on the net 11 or 12 also can be supported. Actually, one or more locks may be used for processing a task depends on needs of an application, the obtained locks for this task will be properly released one at a time along with the task execution up to a point when the task is finally finished. Therefore, each task could be executed without time delay. Also, the task information stored in the entry on the user space task list will be removed upon the execution of the task is completed and the entry will be marked as not used.

If total tasks initiated from the web-console 9 have succeeded the maximum tasks allowed by the console supporting software 6, the initiated task is failed. The locks will be released by the corresponding thread and the user A on the web-console 9 will be notified correspondingly via net.

If an existing task is in a stage of changing a resource object on a target system and if a newly created task will make change on the same resource object on that target system, the newly initiated task may fail or may have to wait until the previous task is finished. Further, if a task is failed, the locks associated with the task will be release by the thread and the user A on the web-console 9 will be notified across the network of 11 or 12 by the console support software 6.

The credential of executing a specific task on a specific target computing system submitted by the user A is checked, where an ordinary users' access & operation permissions and credentials are setup by administrator with supervisor or special privileges. If the user A is not permitted to perform any task on such target computing system or is not permitted to perform such task on any one of the computing systems in the CCDSVM, the task execution will fail and the user A will be notified. Otherwise, the task will be carried out by the corresponding thread on the target computing system, which is either a control management station 2 or a system unit 3.

If there is a need, the console supporting software 6 will send the results or data back to the web-console 9. When the task is failed nor succeeded, the threads of the console supporting software 6 will release the locks acquired for this task.

If the task needs to be executed on the control management station 2, the thread created based on the console supporting software 6 will carry out this task. The threads of the console support software 6 also need to determine if they need to create another thread to execute this task. If there is a need, another thread will be created to execute this task. Once the task is finished, the corresponding locks will be released by the console supporting software 6.

If a task needs to be executed on a system unit 3, the console supporting software 6 will transmit the task information via the net2 12 to the service software module 8 of the target system unit 3. The thread based on the service software module 8 of the target system unit 3 will carry out this task. The service software module 8 on the target system unit 3 needs to determine if an additional thread needs to be created in order to execute such task. If there is a need, an additional thread is created to execute this task. Once the task is finished on the target system unit 3, the corresponding status of the task execution is transmitted back to the console supporting software 6 of the control management station 2. Upon receiving the task finished status, the locks associated with the thread of the console support software 6 for that task are released.

The Task Issued from Web-Console:

The multiple concurrent tasks issued from a web-console 9 by a user could be any of the followings:

a) Move or transmit data such as a multiple gigabytes of file or other data in any form from any point or any computing system to another point or another computing system within the CCDSVM.

b) Configure, partition and assign entire storage system (raid/disk) within the CCDSVM.

c) Setup authentication for a specific user from a web-console on a specific console host with certain privilege for the entire CCDSVM or for a specific computing system, which could be any one of the system units 3 or a control management station 2. Setting up the steps of authentication process for any specific services deliverable by one or more specific system units 3.

d) Monitor and display activities and status for networks, storages, CPUs, processes and threads in the CCDSVM.

e) Create file system, file and directory structures, and support all other related data file operations on either the control management system 2 or on the system units 3.

f) And all other types of tasks and operations that might be run in other OS (operating system) environment.

The capability of providing user with the multiple concurrent operations and tasks on the web console 9 has indicated that this invention has created a web-based user work environment of an operating system for a single computing system or for multiple computing systems. Further, this is a consistent working environment for the operating system for a computing system since it allows a user access to exact the same working environment through the web-console 9, which could be a web browser residing either on the computing system or on a remote system.

User Login:

The user-login mechanism is also supported by the console supporting software 6. The web-console 9 obtains a login web page from the console supporting software 6 via the network of 11 & 12. Once the user provides an account name and a password via the login page displayed in the web-console 9 window, the authentication information is sent to the console supporting software 6 for validation. Upon successful validating the user account and password information, the console support software 6 sends all necessary information such as IP address to the web-console 9, where the information also includes the information of the control management station 2 and system units 3.

The Maximum Tasks:

The maximum multiple concurrent tasks that can be initiated from the web-consoles 9 are determined by the console support software modules 6, and they are also determined based on the needs and the capacity of the control management station 2.

The Credential Checking:

The credential of a user includes the permission to access all or partial computing systems or a single computing system within the CCDSVM. The credential further includes the permission to run all tasks or partial tasks that are listed in the previous section of "The Task Issued From Web-Console". It also includes the permission access specific size of storage volume. For example, the user from a device such as a wireless device can be permitted access to a storage space having multiple GB size on a system in the CCDSVM for storing data therein or retrieving data therefrom. Also, a user B may be granted a permission to run tasks over computing systems X, Y, and Z. Another user C may be granted a permission to run tasks over the entire computing systems in the CCDSVM environment. The user C might be allowed to get system status on the computing systems X, Y, and Z only while the user B may be allowed to run all tasks on the computing systems X, Y, and Z. Each computing system mentioned here could be a control management station 2 or any of system units 3. This basically represents a two-level authentication policy and checking. The first level is the security imposed on the control management station 2 and the second level is the security imposed on the system units (3 of FIG. 2).

The Web-Server Interface Software Modules:

The web-server interfacing software module 5 is responsible to get information from or send information to the web server software 7. It also interacts with the control management modules 4 via inter-process communication and communicates with service module 8 of the system unit 3 via the net2 12.

The Control Management Software Modules:

The control management modules 4 on the control management station 2 are responsible for communicating with the system units 3 for sending data to or receiving data from the system units via the net2 12. It also provides information of the system units 3 to the web interface software modules 5 of the control management station 2 via an inter-process communication mechanism.

The Layered CCDSVM Structure:

To be more efficiently supporting multiple concurrent tasks over a larger number of the system units 3, the CCDSVM can be organized into a multi-layered structure as illustrated in FIG. 6. With this layered structure, the CCDSVM can be sub-divided into different groups. For example, each one of level-2 control management stations could function both as the control management station 2 for controlling the system units 3 below it and as a system unit 3 that is controlled by the level-1 control management station 2. Therefore, the level-2 control management station must be configured with related software modules for both the control management station 2 and the system unit 3.

The invention claimed is:

1. A device comprising:
at least one hardware processor, and one non-transitory computer-readable medium comprising program instructions which, being executed by the device, cause the device processing tasks, wherein the program instructions comprises:
program instructions for the device displaying an application service upon receiving information of the service from a server across a network, the server configured for delivering the service; and
program instructions for the device processing a first task for access the service in response to a user through the service displayed performing the first task, wherein said program instructions for processing a first task includes:
program instructions for storing information of the first task and for protecting the storing of the information;
program instructions for processing the first task in the background according to the stored information of the first task, causing the displaying of the service on the device without being blocked, and responding to a second task for access to the service without waiting for completion of the first task upon the user through the service displayed performing the second task; and
program instructions for removing the stored information of the first task in respect to the completion of the first task.

2. The device as recited in claim 1, wherein said application service comprises one of a video service, web service, database service, security monitoring service, file service, or storage service.

3. The device as recited in claim 2, wherein each of the first and second tasks further comprises for access a video, a database, another service, a file, a folder, a file system, a storage space, authentication information of a user, or information of a storage or network.

4. The device as recited in claim 1, wherein said program instructions for processing a first task comprises program instructions for sending the first task to the server for the server further processing and carrying out the first task for access the service.

5. The device as recited in claim 4, wherein said program instructions for processing a first task further comprises program instructions for displaying a response received from the server, the response comprising status or result of the processing of the first task.

6. The device as recited in claim 1, wherein said program instructions for displaying service comprise program instructions for displaying the service in a web based user interface, including to display operation menu for access to the service.

7. The device as recited in claim 1, wherein said program instructions for displaying service further comprise program instructions for: displaying the service in a non-web based user interface, including to display operation menu for access to the service.

8. The device as recited in claim 1, wherein the program instructions for responding to a second task comprises program instructions for storing information of the second task and protecting the storing of the information, and program instructions for processing the second task according to the stored information of the second task without waiting for the completion of the first task.

9. A computer program product tangibly stored in a non-transitory computer-readable medium in a device and comprising program instructions that, being executed by the device, cause the device processing tasks, wherein the program instructions comprise:
program instructions for the device displaying an application service upon receiving information of the service from a server across a network, the server configured for delivering the service; and
program instructions for the device processing a first task for access the service in response to a user through the service displayed performing the first task, wherein said program instructions for processing a first task includes:
program instructions for storing information of the first task and for protecting the storing of the information;
program instructions for processing the first task in the background according to the stored information of the first task, causing the displaying of the service on the device without being blocked, and responding to a second task for access to the service without waiting for completion of the first task upon the user through the service displayed performing the second task; and
program instructions for removing the stored information of the first task in respect to the completion of the first task.

10. The program product of claim 9, wherein said program instructions for processing a first task comprises program instructions for: sending the first task to the server for the server further processing and carrying out the requested access to the service.

11. The program product of claim 10, wherein said program instructions for processing a first task further comprise program instructions for the device displaying a response received from the server, the response comprising the status or result of the processing of the first task.

12. The program product of claim 9, wherein said service comprises one of a video service, web service, database service, security monitoring service, file service, or storage service.

13. The program product of claim 12, wherein each of the first and second tasks at least comprises for access one of a video, a database, another service, a file, a folder, a file system, a storage space, authentication information of a user, or information of storages, networks.

14. The program product of claim 9, wherein said program instruction for displaying service further comprises program instructions for: displaying the service in a web browser based user interface, including to display operation menu for access to the service.

15. The program product of claim 9, wherein said program instruction for displaying service further comprises program instructions for: displaying the service in a non-web based user interface, including to display operation menu for access to the service.

16. The program product of claim 9, wherein the program instructions for responding to a second task comprise program instructions for storing information of the second task and protecting the storing of the information, and program instructions for processing the second task according to the stored information of the second task without waiting for the completion of the first task.

17. A method for access an application service, comprising:
  displaying the application service on a device upon the device receiving the information of the service from a server across a network, the server being configured for delivering the service;
  processing a first task for access to the service in response to a user through the service displayed on the device performing the first task, wherein the processing of the first task include:
    storing information of the first task and protecting the storing of the information; and
    processing the first task in the background according to the stored information of the first task, causing the service being displayed on the device without being blocked and responding to a second task for access the service without waiting for completion of the first task upon the user through the service displayed performing the second task; and
  removing the stored information of the first task in respect to the completion of the first task.

18. The method of claim 17, wherein said responding to a second task comprises: storing information of the second task and protecting the storing of the information, and processing the second task according to the stored information of the second task without waiting for the completion of the first task.

19. The method of claim 17, wherein said processing a first task comprises: sending the first task to the server for the server further processing and carrying out the requested access to the service.

20. The method of claim 19, further comprising: displaying a response received from the server, the response comprising the status or result of the processing of the first task.

* * * * *